UNITED STATES PATENT OFFICE

1,960,194

COVERED WELD ROD OR WIRE AND METHOD OF MAKING SAME

Robert McHenry, Baltimore, Md., assignor to Reid-Avery Company, Philadelphia, Pa., a corporation of Delaware No Drawing. Application October 25, 1930, Serial No. 491,324

5 Claims. (Cl. 219—8)

The principal objects of the present invention are to provide covered weld rods or wire having a smooth polished surface and in which the coating of appreciable thickness is strongly adherent to the rods or wire and is uniformly distributed on the surface of the same, and to provide an expeditious and comparatively inexpensive method of producing such weld rods or wire.

To these and other ends hereinafter set forth or appearing the invention comprises a weld rod or wire having an appreciable coating which may well contain a binder such as sodium silicate and presenting a polished and uniform surface.

The invention also consists in the process of making covered weld rods or wire having a polished surface which includes coating the rod or wire with an appreciable coating of ordinary and usual composition and, when dry, wire drawing the coated rod or wire through a die.

To explain and not limit the invention, it may be said that it is customary to pull metallic weld rods or wire of finished size through a bath in order to coat the same and through a heated chamber in order to dry the same. The wire thus coated is sold and used. The coating is not strongly adherent, resembling whitewash, and readily comes off or can be readily removed and is rough. The bath usually contains as one ingredient sodium silicate or an equivalent and one or more metallic oxides or the like. In the practice of this invention usual procedure is followed while the coated rod or wire is oversized in the sense that it is of larger diameter than is required in the finished product. Hitherto it has been customary to groove, indent or otherwise roughen the surface of the metal rod or wire prior to coating it. In comparison with unroughened coated wire or rods to which reference has been made the weld rod or wire of the present invention is characterized by a smooth polished coated surface and by the fact that the coating is strongly adherent and cannot be readily removed by abrasion, scratching or the like, and in comparison with the notched or grooved wire or rods to which reference has been made, the product of the present invention is much cheaper to manufacture, the coating is much more uniform and strongly adherent, and the surface is smooth, uniform and polished. According to the present invention the oversized flux coated weld rod or wire is drawn through a die. This may be done when the coating is dry and an appropriate lubricant, also dry, may be employed. In the wire drawing operation through a die the wire or rod and the coating thereon are subjected to heat and pressure and the wire or rod and the coating thereon are elongated with corresponding reduction in diameter to the size required. A flow of metal and of its coating probably occurs, at any rate the surface is smooth and polished and the coating is strongly adherent and in use the finished product produces excellent results. The coated wire may be drawn through a series of dies with corresponding elongation and reduction in cross-section and the flux or coating remains uniformly distributed and the surface is smooth and polished as has been described. Wire drawing weld rods or wire coated with flux appears to result in a self-produced union between the rod and flux at the same time producing a burnished, smooth glossy surface.

It will be obvious to those skilled in the art to which the invention relates that modifications may be made in details of construction and arrangement and matters of mere form without departing from the spirit of the invention which is not limited to such matters or otherwise than the prior art and the appended claims may require.

I claim:

1. Weld rods or wire having all over it an appreciable coating of flux and presenting a polished and smooth surface.

2. Weld rods or wire having all over it an appreciable coating of flux containing a binder and presenting a smooth and polished surface.

3. Weld rods or wire having all over it an appreciable coating of flux containing sodium silicate and presenting a polished and smooth surface.

4. A weld rod or wire having an appreciable coating of flux directly incorporated on the outer metal surface of the rod or wire and presenting a polished and smooth surface.

5. A process of making covered weld rods or wires having a smooth polished surface, which process includes directly coating the metal surface of over-sized rods or wires with an appreciable coating of flux, and incorporating or impregnating the flux directly with the metal surface of the rods or wires by drawing the coated rods or wires through a die, thereby reducing their cross-section.

ROBERT McHENRY.